United States Patent
Mokhasi et al.

(10) Patent No.: US 10,332,111 B2
(45) Date of Patent: Jun. 25, 2019

(54) AUTHENTICATION WITH SMARTWATCH

(71) Applicant: VISA INTERNATIONAL SERVICE ASSOCIATION, San Francisco, CA (US)

(72) Inventors: Gaurav Srikant Mokhasi, Bengaluru (IN); Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 349 days.

(21) Appl. No.: 15/159,627

(22) Filed: May 19, 2016

(65) Prior Publication Data

US 2017/0337554 A1    Nov. 23, 2017

(51) Int. Cl.
*G06F 1/16* (2006.01)
*G06Q 20/40* (2012.01)
(Continued)

(52) U.S. Cl.
CPC ......... *G06Q 20/4014* (2013.01); *G04G 21/00* (2013.01); *G06F 1/163* (2013.01); *G06F 3/0362* (2013.01); *G06F 3/0482* (2013.01); *G06F 3/0485* (2013.01); *G06F 3/04817* (2013.01); *G06F 3/04842* (2013.01); *G06F 3/04847* (2013.01); *G06F 3/04883* (2013.01);
(Continued)

(58) Field of Classification Search
CPC .......... G06Q 20/3278; G06Q 30/0641; G06Q 20/352; G06Q 20/105; G06Q 20/12; G06Q 20/30; G06Q 20/32; G06Q 20/322; G06Q 20/327; G06Q 20/351; G06Q 20/36
See application file for complete search history.

(56) References Cited

U.S. PATENT DOCUMENTS 3,935,700 A * 2/1976 Van Haaften .......... G04C 3/001
                                                        368/29
4,403,869 A * 9/1983 Crutcher .................. G04G 9/12
                                                        368/10
(Continued)

FOREIGN PATENT DOCUMENTS

CN    105117120 A    12/2015
CN    105224208 A     1/2016
(Continued)

OTHER PUBLICATIONS

Apple Pay, "Make secure purchases in stores, in apps, and now on the web." Downloaded Apr. 12, 2017, 7 pages, downloaded from http://www.apple.com/apple-pay/.
(Continued)

*Primary Examiner* — Christopher Stanford
(74) *Attorney, Agent, or Firm* — Kilpatrick Townsend & Stockton LLP

(57) ABSTRACT

Embodiments of the disclosure are directed to performing a transaction between a smartwatch and an access device. Transaction details are transmitted by an antenna of a smartwatch to a contactless transaction module. An interface is rendered to a display of the smartwatch. An input of the interface is adjusted in response to a rotation of a crown of the smartwatch. The input is transmitted, by the antenna of the smartwatch, to a contactless transaction module in response to a confirmation of the input by a user of the smartwatch.

20 Claims, 9 Drawing Sheets

(51) Int. Cl.
*G06F 3/0481* (2013.01)
*G06F 3/0482* (2013.01)
*G06F 3/0484* (2013.01)
*G06F 3/0485* (2013.01)
*G06F 3/0488* (2013.01)
*G06F 21/62* (2013.01)
*G06Q 20/32* (2012.01)
*G06F 21/31* (2013.01)
*G06F 21/45* (2013.01)
*G04G 21/00* (2010.01)
*G06F 3/0362* (2013.01)
*H04W 12/06* (2009.01)

(52) U.S. Cl.
CPC .............. *G06F 21/31* (2013.01); *G06F 21/45* (2013.01); *G06F 21/6218* (2013.01); *G06Q 20/3278* (2013.01); *G06Q 20/4012* (2013.01); *H04W 12/06* (2013.01)

(56) References Cited

U.S. PATENT DOCUMENTS

| | | | |
|---|---|---|---|
| 4,786,900 A * | 11/1988 | Karasawa | G07C 9/00031 340/5.32 |
| 8,065,235 B2 | 11/2011 | Narayanaswami et al. | |
| 8,908,477 B2 * | 12/2014 | Peters | G04G 21/00 340/5.55 |
| 9,100,493 B1 | 8/2015 | Zhou et al. | |
| 9,195,812 B2 * | 11/2015 | Bonhoff | G06F 21/31 |
| 9,978,055 B2 * | 5/2018 | Jeong | G06Q 20/34 |
| 2004/0113819 A1 * | 6/2004 | Gauthey | G06F 21/36 341/34 |
| 2015/0015502 A1 | 1/2015 | Al-Nasser | |
| 2015/0229750 A1 | 8/2015 | Zhou et al. | |
| 2016/0066140 A1 * | 3/2016 | Gnanasekaran | H04W 4/021 455/456.3 |
| 2016/0086176 A1 | 3/2016 | Silva Pinto et al. | |
| 2016/0091867 A1 | 3/2016 | Mansour et al. | |
| 2018/0181733 A1 * | 6/2018 | Shim | G06F 21/32 |

FOREIGN PATENT DOCUMENTS

| | | | |
|---|---|---|---|
| DE | 102005045430 A1 | 4/2006 | |
| KR | 1020150029105 | 3/2017 | |
| WO | 2011057149 | 5/2011 | |
| WO | 2015065402 A1 | 5/2015 | |
| WO | WO 2016095403 A1 * | 6/2016 | ............. G06Q 20/30 |

OTHER PUBLICATIONS

PCT/US2017/027473, "International Search Report and Written Opinion", dated Jun. 22, 2017, 16 pages.

EP17799829.1, "Extended European Search Reports", dated Apr. 9, 2019, 12 pages.

* cited by examiner

AUTHENTICATION WITH SMARTWATCH

BACKGROUND

With the development of mobile devices, wearables, Radio-Frequency Identification (RFID) tags and readers, contactless data exchanges have become ubiquitous. NFC (Near-Field Communication) is an example RFID protocol that uses radio waves to send and/or receive data. Some mobile devices (e.g. smart phones, tablets) have integrated hardware to allow for contactless data exchanges consistent with NFC, for example.

In some contexts, a contactless data exchange is executed to obtain building access, sharing media, or completing a purchase, for example. In these exchanges, the data may be communicated by a mobile device or a smartwatch to a contactless module. In addition, a user may confirm her desire to exchange the data by entering a confirmation code or an authentication number.

Smartwatches generally include smaller interfaces than smartphones or other mobile devices. For example, a screen (and overlayed touchscreen) of a smartphone may be approximately 10 cm by 7 cm, while a screen (and overlayed touchscreen) of a smartwatch may be approximately 3 cm by 3 cm. With fingertips in excess of 1.5 cm, entering data into a smartwatch can be cumbersome and error-prone. In recognition of this problem, data is often entered into smartwatches via a smartphone or other hardware interface. In addition to small screens, smartwatches also generally have fewer and smaller hardware buttons and switches than other mobile devices, which further limits the data input capabilities of a smartwatch. Therefore, entering a confirmation code or an authentication number to confirm a contactless data exchange on a smartwatch can be problematic.

Embodiments of the present invention are directed to methods, systems and devices for data communication between devices and an access device. Embodiments of the invention address these and other problems, individually and collectively.

BRIEF SUMMARY

Embodiments of the invention are directed to devices, systems, and methods of performing a data exchange. In this disclosure, a smartwatch and an access device may be used to authorize a contactless data exchange. In particular, a crown of a smartwatch is used to transmit an input to a contactless data module to complete a contactless data exchange process.

In one embodiment, a smartwatch includes a housing, a display, an antenna, a crown of the smartwatch configured to be retracted from the housing and configured to be rotated, processing logic, and a computer-readable medium (e.g. flash memory). The processing logic may be coupled to drive the display and coupled to send and receive wireless signals of the antenna. The computer-readable medium includes instructions executable by the processing logic. The processing logic may execute a method including performing a component of a transaction authorization process with an application of the smartwatch. The component may include adjusting an input of the interface rendered to the display in response to sensing a rotation of the crown of the smartwatch. The component may also include transmitting (with the antenna) the input to a contactless transaction module in response to a selection of the input by a user of the smartwatch to complete the transaction authorization process.

In one aspect, the interface is an analog clock interface and the rotation of the crown moves hands of an analog clock in the analog clock interface and the input is a digital representation of an analog time that the analog clock is set to. The component of the transaction authorization process may further include rendering the analog clock interface in response to sensing that the crown has been retracted from the housing of the smartwatch and saving an image of the analog clock interface to a memory of the smartwatch in response to sensing that the crown has been pushed back into the housing. Image processing analysis of the image may assist in determining the digital representation of the analog time that he analog clock interface showed when the crown is pushed back in the housing.

In one aspect, the interface includes at least a first data field and a second data field. Adjusting the input may include adjusting a first element of the first data field in response to a first rotation of the crown, advancing to the second data field in response to sensing the crown has been pushed back in to the housing, and adjusting a second element of a second data field in response to a second rotation of the crown. In one embodiment, the input includes the first element and the second element. The selection of the input may include sensing the crown has been pushed back into the housing after sensing the second rotation of the crown.

In one aspect, the above described component is a second component of the transaction authorization process and a first component is also performed by the smartwatch that includes transmitting, by the antenna, transaction details to a contactless transaction module, In one embodiment, a method of authorizing a transaction includes transmitting, by an antenna of a smartwatch, transaction details to a contactless transaction module. The method also includes rendering an interface on a display of the smartwatch and adjusting an input of the interface in response to sensing a rotation of a crown of the smartwatch. The input is transmitted by the antenna of the smartwatch to the contactless transaction module in response to the confirmation of the input by a user of the smartwatch. The antenna may be configured to facilitate near-field communication (NFC).

These and other embodiments of the invention are described in further detail below.

DETAILED DESCRIPTION

Figure 1:
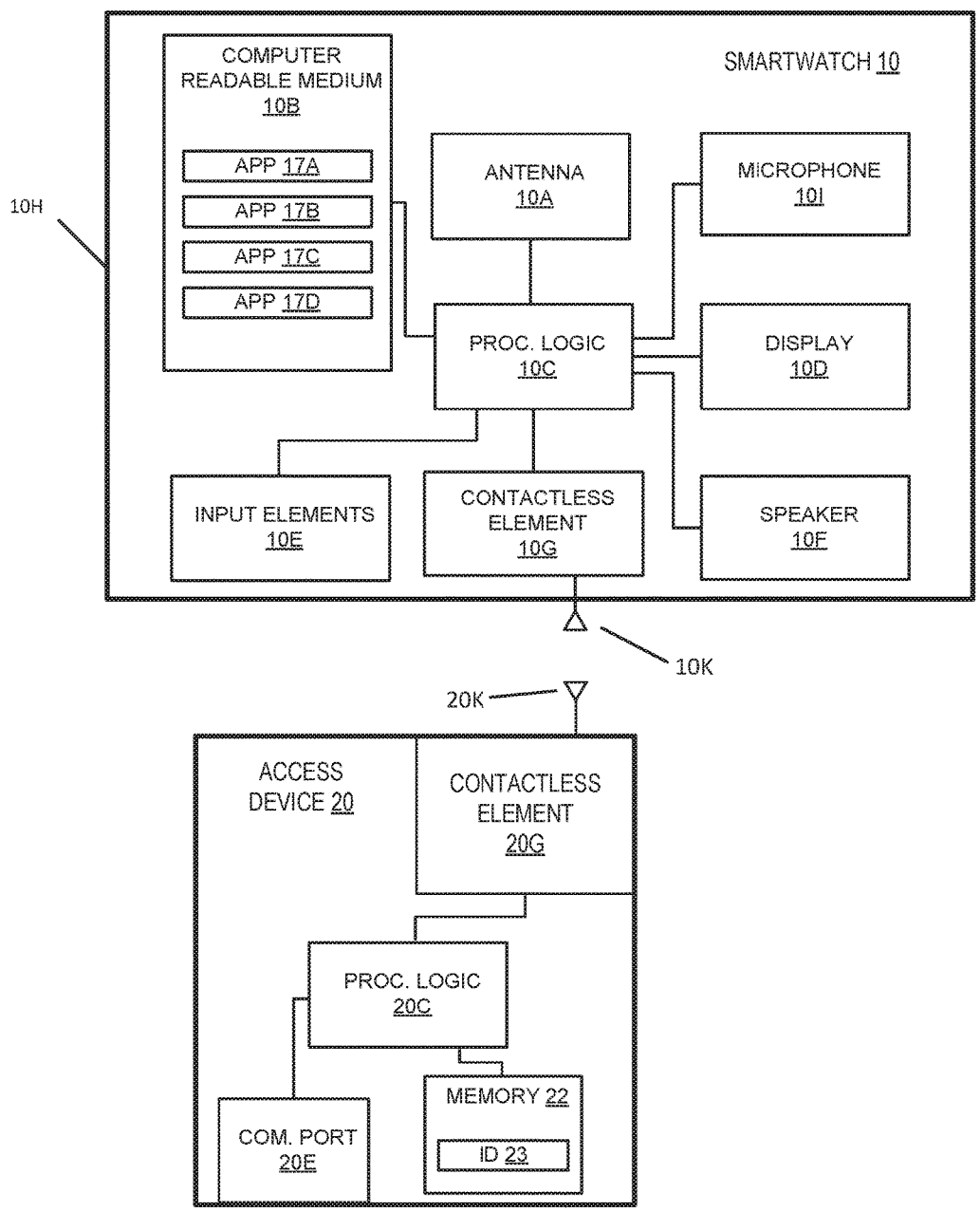
FIG. 1 shows a block diagram of a system including a smartwatch and an access device, according to an embodiment of the invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for contactless data exchanges between smartwatches and access devices or contactless transaction modules. A crown of the smartwatch may be used to adjust an input of at least one component of a contactless data exchange. In a contactless data exchange, data to perform the transaction may be communicated or exchanged. In a payment transaction, the transaction data may be account details to facilitate a purchase. An additional input may also be required to perform the contactless data exchange. The user may input a confirmation code or authentication number using a crown of a smartwatch and that confirmation code or authentication number authorizes the contactless data exchange. The crown of the smartwatch may be rotated or retracted from a housing and pushed back into the housing to facilitate inputting the confirmation code or authentication number. In one embodiment, rotating the crown of the smartwatch adjusts a time of an analog clock interface displayed on a display of the smartwatch as the confirmation code or authentication number. The "time" shown by the analog clock interface is used as the confirmation code or authentication number. Advantageously, adjusting the time of the analog clock interface is an expedient way to enter a confirmation code or authentication number that is multiple digits. In addition, changing an analog clock interface is a discreet way of entering a confirmation code or authentication number that should be kept secret by the user of the smartwatch. Furthermore, in the context of a smartwatch, using a crown of the smartwatch as an input offers a mechanically efficient option to select and scroll through numbers or letters that are part of an input, Prior to discussing embodiments of the invention, description of some terms may be helpful in understanding embodiments of the invention, A "smartwatch" may include any electronic device for wearing on or about a wrist of a user. A smartwatch includes processing logic coupled to drive a display of the smartwatch to render images. The display may be an active-matrix liquid crystal display (AMLCD) or an organic light emitting diode (OLED) display, for example. The smartwatch may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A smartwatch may also communicate with a mobile phone via a short range communication protocol such as Bluetooth (classic or Bluetooth low energy).

A "mobile application" may be a computing program that is used on a smartwatch for a specific purpose. A mobile application may be designed, published, and updated by a bank, a merchant, a company, or otherwise. The mobile application may be designed specifically for a specific smartwatch.

An "access device" may be any suitable device that provides access to a remote system or to a site. An access device may also be used for accessing a transaction processing system that includes communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device, including a smartwatch. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "authorization request message" may be an electronic message that requests authorization for a transaction. In some embodiments, it is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it is generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

The term "computer" as used herein refers to a system comprising a processor and a computer readable medium, such as computer memory or other data storage device, coupled to the processor. The computer readable medium stores code executable by the processor.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

"Processing logic" may refer to any suitable data computation device or devices such as a processor, field-programmable gate array, or otherwise. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

In the following description, an "acquirer" is typically a business entity (e.g., a commercial bank) that has a business relationship with a particular merchant. An "issuer" is typically a business entity (e.g., a bank or credit union) which issues a payment device (such as a credit card, debit card, smart card, prepaid device or contactless device) to an account owner and which provides administrative and management functions for the payment account. Some entities may perform both issuer and acquirer functions. A payment account may be any account usable in a transaction, such as a credit, debit or prepaid account.

FIG. 1 shows a block diagram of a system 100 including a smartwatch 10 and an access device 20, according to an embodiment of the invention. In some embodiments, the smartwatch 10 may be used as payment device that can be used to make payments or a device which can allow a user to gain access to a location. The exemplary smartwatch 10 may comprise a computer readable medium 10B that can be present within the housing 10H of the smartwatch 10. The computer readable medium 10B may be in the form of a memory that stores data. In some cases, the computer readable medium 10B may also store information such as access data (e.g., account numbers, access IDs, etc.). The computer readable medium 10B may comprise instructions or code, executable by the processor for implementing a method of performing or confirming a transaction. In general, any of this information may be transmitted by the smartwatch 10 to another device, using any suitable method, including the use of antenna(s) 10A or contactless element 10G in conjunction with antenna 10K. Antenna(s) 10A may be configured for mobile phone communication (e.g. 3G, 4G, and/or LTE) and wireless networking protocols such as IEEE (Institute of Electronics Engineers) 802.11. The housing 10H may be in the form plastic, metal, glass, or other structure. An antenna 10K of contactless element 10G may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism. Contactless element 10G may be implemented in the form of a semiconductor chip (or other data storage element) with an associated wireless transfer (e.g., data transmission) element, such as an antenna 10K. Contactless element 10G may be embedded within the smartwatch 10. Smartwatch 10 may comprise components to both be the interrogator device (e.g. receiving data) and the interrogated device (e.g. sending data). Thus, the smartwatch 10 may be capable of communicating and transferring data or control instructions via both cellular network (or any other suitable wireless network—e.g. the Internet or other data network) and short range communications.

The smartwatch 10 may also include processing logic 10C (e.g., a microprocessor, FPGA) for processing the functions of the smartwatch 10 and a display 10D to allow a consumer to see phone numbers and other information and messages. The smartwatch 10 may further include input elements 10E (e.g. buttons, touchscreen, crown) to allow a user to input information into the device, a speaker 10F to allow the user to hear voice communication, music, etc., and a microphone 10I to allow the user to transmit her voice through the smartwatch 10. As will be discussed in more detail below, a crown of the smartwatch 10 may include a crown configured to be rotated. Processing logic 10C may be configured to sense the rotation of the crown as well as sense a retracted and unretracted position of the crown.

In FIG. 1, computer readable medium 10B is coupled to the processing logic 10C and may store a first application 17A, a second application 17B, a third application 17C, and a fourth application 17D. The computer-readable medium 10B may be in the form of one or more memory devices (e.g., RAM, EEPROM, ROM chips), using any suitable mode of data storage. In some embodiments, the computer-readable medium 10B in the smartwatch 10 may also include a secure storage area for storing sensitive data such as payment credentials (account numbers, payment tokens, verification values, etc.) and access data. For example, the computer-readable medium 10B may be part of or may contain a secure element.

In some embodiments, the first application 17A is a mobile banking application. The mobile banking application may be designed and maintained by a bank or payment processing network. The second application 17B may be a digital wallet application. The third application 17C may be designed and published by a first merchant and the fourth application 17D may be designed by a second merchant. Other applications not specifically mentioned may also reside in computer-readable medium 10B of smartwatch 10.

System 100 also includes an access device 20. Access device 20 includes a contactless element 20G, processing logic 20C, a memory 22, and a communication port 20E. Contactless element 20G is configured to communicate with (send and/or receive data) with contactless element 10G. Processing logic 20C is configured to facilitate data exchanges between contactless element 20G and contactless element 10G. Contactless element 20G includes antenna 20K for sending and receiving wireless signals. Memory 22 and a communication port 20E are coupled to processing logic 20C. In one embodiment, communication port 20E is wired (e.g. Ethernet). In one embodiment, the communication port 20E includes hardware to facilitate wireless network communication (e.g. IEEE 802.11).

Figure 2:
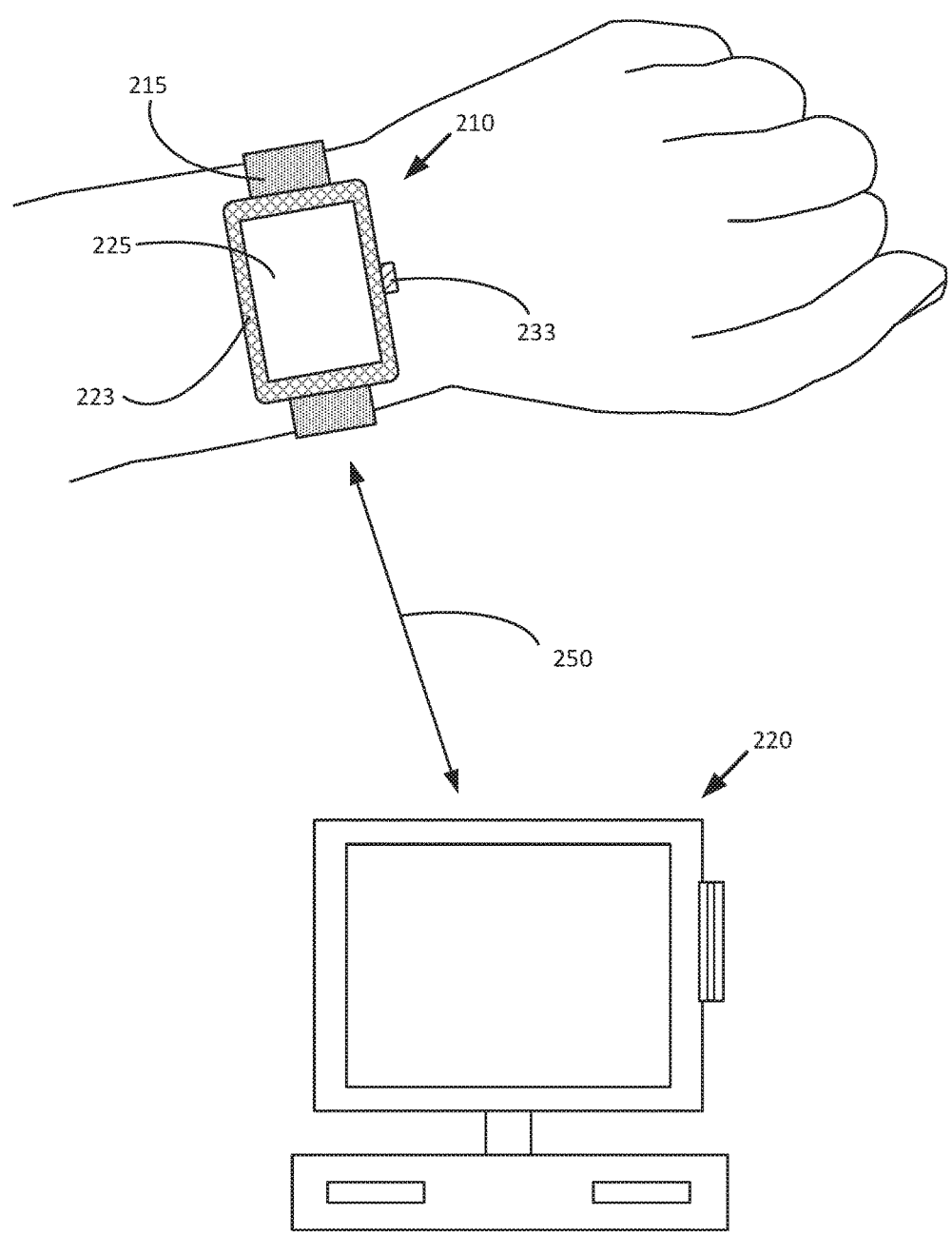
FIG. 2 illustrates a system including a contactless transaction module and a smartwatch, according to an embodiment of the invention.

FIG. 2 shows a diagram of a system 200 including a contactless transaction module 220 and a smartwatch 210. Contactless transaction module 220 may be a Point-of-Sale terminal configured to perform contactless payment transactions using NFC, for example. Contactless transaction module 220 may be associated with a merchant and smartwatch 210 may be possessed and operated by a user. Contactless transaction module 220 and smartwatch 210 may be configured similarly to access device 20 and smartwatch 10, respectively. In the illustrated embodiment, smartwatch 210 includes a housing 223, a display 225, a wristband 215, and a crown 233.

The user may be able to use smartwatch 210 for conducting purchases at the merchant or gaining access to a site. The smartwatch 210 is worn on or about the wrist of the user, in FIG. 2. Smartwatch 210 may be able to communicate with the contactless transaction module 220 and/or provide payment credentials to the contactless transaction module 220. The contactless transaction module 220 can then submit the payment credentials into a transaction processing system in order to perform transaction authorization and other transaction processing. An example of such a transaction processing system can include a merchant computer, an acquirer computer, a transaction processing computer, and an issuer computer (none of which are shown in FIG. 2). The payment credentials may be sent to the transaction processing system via a communication port of the of contactless transaction module 220 by a communication port similar to communication port 20E, for example.

The smartwatch 210 may be able to communicate with the contactless transaction module 220 via one or more wireless communication pathways 250. For example, the smartwatch 210 may be able to communicate with the contactless transaction module 220 via contactless communications, such as NFC (Near Field Communication), BLE (Bluetooth Low Energy), RFID (Radio Frequency Identifier), or any other suitable form of short or medium range communications mechanism.

The smartwatch 210 and the contactless transaction module 220 may also be able to communicate with other entities. For example, the smartwatch 210 may be able to communicate with cell towers (e.g., via cellular communications such as GSM, LTE, 4G) and wireless routers (e.g., via WiFi). Also, the contactless transaction module 220 may be able to communicate with a merchant computer or other entities in a transaction processing system.

The smartwatch 210 may store or have access to certain types of user information. For example, the smartwatch 210 may store the user's payment credentials, such as a PAN (primary account number), a payment token, a name, an address, a CVV, an expiration date, and any other suitable information. Such data may be securely stored via hardware (e.g., a secure element) or software. The smartwatch 210 may also include a digital wallet application, which may include information about one or more user payment accounts. The user may be able to add payment accounts, set a default account, prepare the smartwatch 210 for a payment, and perform other payment-related functions via the digital wallet application.

In one embodiment, a payment card (e.g., a credit card or debit card) may be used to interact with contactless transaction module 220 in addition to smartwatch 210. For example, some payment cards may have chip-based data storage and/or contactless communication capabilities (e.g., NFC, BLE, RFID). Accordingly, some payment cards may be able to interact with the contactless transaction module 220 of FIG. 2.

Figure 3:
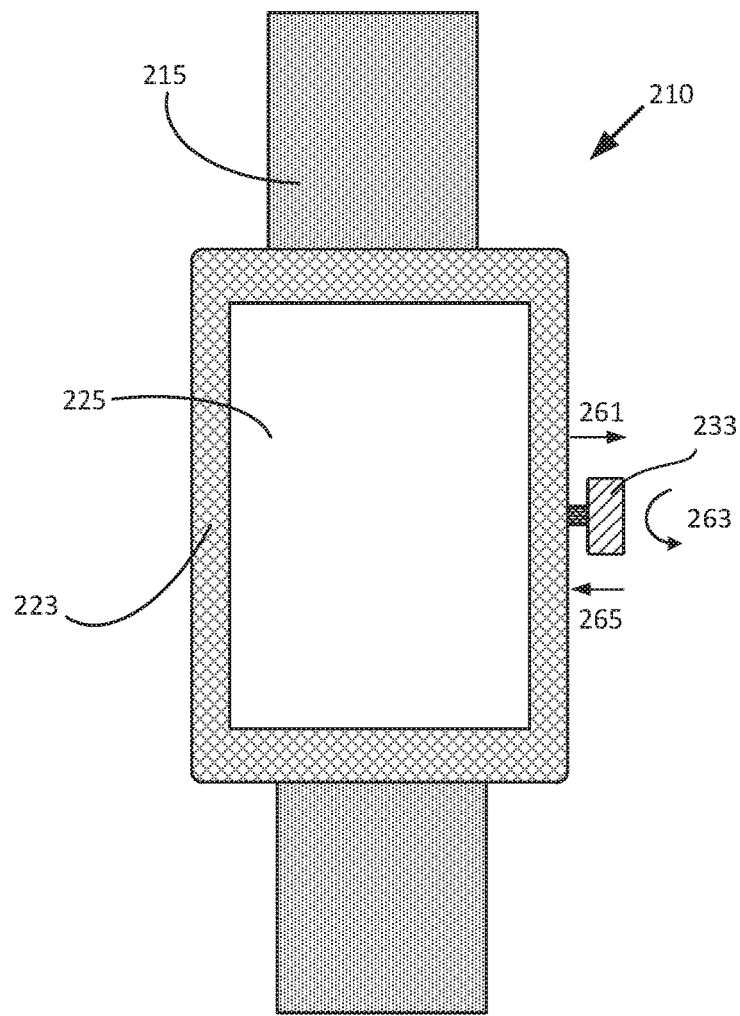
FIG. 3 illustrates a smartwatch having a housing, a display, and a crown, according to an embodiment of the invention.

FIG. 3 shows an enlarged view of smartwatch 210. In the illustration of FIG. 3, smartwatch 210 includes a housing 223, a display 225, a wristband 215, and a crown 233. The crown 233 is configured to be retracted from the housing 223 into a retracted position 261. From the retracted position 261, crown 233 may be pushed back into the housing to the unretracted position 265. Crown 233 can be rotated 263 in both clockwise and counter-clockwise rotations directions.

Figure 4B:
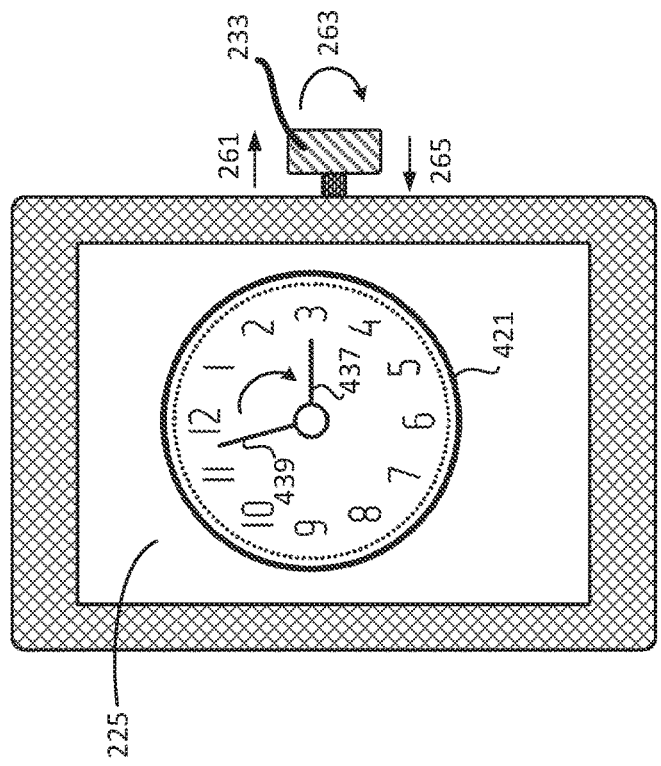
FIGS. 4A and 4B illustrates interfaces and a rotation of a crown of he smartwatch adjusting an input, according to embodiments of the invention.
Figure 4A:
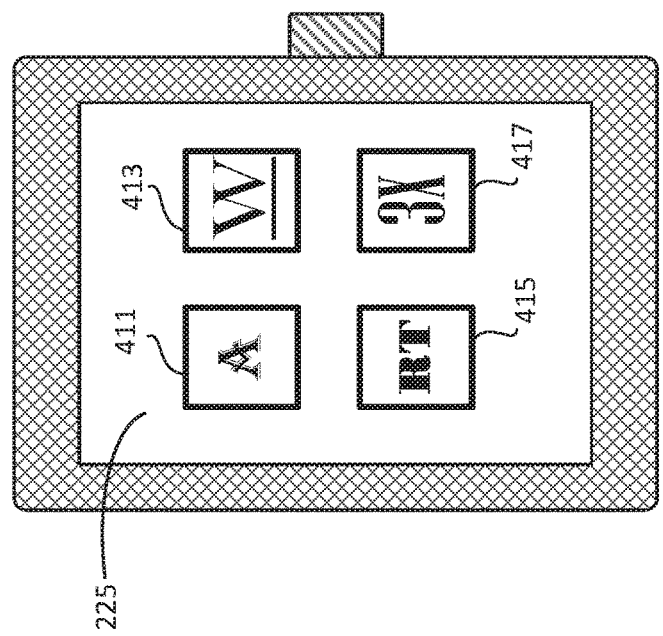

FIGS. 4A and 4B illustrates interfaces and rotating a crown of the smartwatch to adjust an input, according to embodiments of the invention. In FIG. 4A, application icons 411, 413, 415, and 417 are rendered on the display 225 of smartwatch 210. Application icons 411, 413, 415, and 417 represent mobile applications that are stored within smartwatch 210 and can be run on a computing environment of smartwatch 210. A user may select one or more goods and/or services for purchase at a merchant, and then desire to initiate a payment transaction. The user may choose to pay using a smartwatch 210. In the illustrated embodiment, the user may select one of the application icons 411, 413, 415, or 417 to select a mobile application to perform the transactions. Application icons 411, 413, 415, or 417 may correspond to application 17A, 17B, 17C, and 17D, respectively. A user may select an application icon using a touchscreen (e.g. capacitive touchscreen) overlayed on display 225. The user may select the application icon using other input methods as well. The application icon may represent a digital wallet application or banking application that can facilitate mobile payments, for example. Within the mobile payment application, the user may select a payment account to initiate payment for the good or services being purchased. To facilitate a contactless payment transaction, the user may hold the smartwatch 210 near to (e.g., within communication proximity of) the contactless transaction module 220. In one embodiment, contactless transaction module 220 emits an interrogation signal and payment applications that can facilitate a contactless payment transaction are rendered to display 225 by smartwatch 210 in response to receiving the interrogation signal from contactless transaction module 220.

In one embodiment, a contactless payment transaction includes a first component and a second component. In the first component, the smartwatch 210 sends the contactless transaction module 220 transaction details. The transaction details may include payment credentials associated with an account to pay for the transaction. For example, a primary account number (PAN), user name, expiration data, and/or CVV may be provided to the contactless transaction module 220 by smartwatch 210, via NFC for example. Smartwatch 210 may provide tokenized versions of the transaction details to the contactless transaction module 220. The transaction details provided in the first component may be considered a "what he has" component since the transaction details are traditionally available on a credit card possessed by a user, and in the case of the smartwatch, these same transaction details are available in a memory of the smartwatch 210 possessed by the user. In some contexts, and by law in some jurisdictions, the user must supply a second component to authorize the transaction. The second component is sometimes referred to as a "what he knows" component and prompts the user to provide an additional input to confirm the transaction. A PIN (personal identification number) is an example of a "what he knows" input since a PIN is supposed to be remembered by the user and not written down or embedded within a credit card. The first and second components may be considered first and second parts of a transaction.

Using a smartwatch to provide a "what he knows" input presents a number of challenges. First, entering data into smartwatches is more cumbersome than entering data into a smartphone, for example. Second, it is difficult to discreetly enter a "what he knows" input with a smartwatch such that an unauthorized user in view of the smartwatch does not come to discern the "what he knows" input being entered by a user of the smartwatch.

FIG. 4B illustrates an analog clock interface rendered to the display 225 of smartwatch 210. A rotation 263 of crown 233 moves hands 437 and 439 of the analog clock 421 in the analog clock interface. In one embodiment, a digital representation of the analog time that the analog clock 421 is set to is used as a confirmation code (e.g. a PIN) to authorize and complete a transaction. In this way, a user is able to enter his "what he knows" input using the crown 233 of smartwatch 210. In the illustrated example of FIG. 4B, the user's PIN is 1115 and the user has set that analog clock 421 of the analog clock interface to 11:15. In other embodiments, the minute hand 439 could simply be used to enter numbers. For example, if the PIN was the number "258" then the minute hand could be moved to the number, "2," "5," and then "8." In between the numbers, the user may interact with the smartwatch 210 to inform the smartwatch 210 that the user has entered a discrete value. For instance, after entering the number "2," the user might push or pull the crown 233 to inform the smartwatch that a number has been selected by the user. Other ways to interact may be to shake or move the smartwatch or tap its screen.

Figure 6:
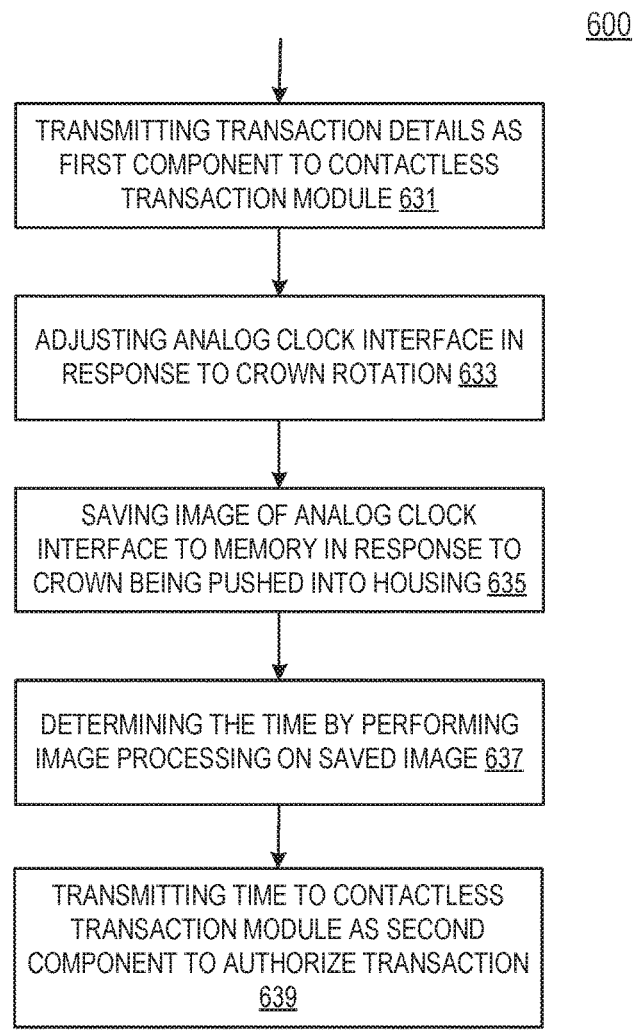
FIGS. 6-7 illustrates an example method of authorizing a transaction using a crown of a smartwatch, according to embodiments of the invention.

To illustrate further, FIG. 6 depicts an illustrative flow chart demonstrating an example process 600 for authorizing a transaction. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by processing logic 10C in conjunction with contactless element 10G and antenna 10K of a smartwatch. The code may be stored on a computer-readable storage medium (e.g. 10B), for example, in the form of a computer program including a plurality of instructions executable by one or more processors. The computer-readable storage medium may be non-transitory.

In process block 631, transaction details are transmitted by a smartwatch to a contactless transaction module (e.g. contactless transaction module 220) as a first "what he has" component of a transaction. In some cases, the "what he has" component may alternatively be referred to as authentication data that is present in the smartwatch. The transaction details may include payment credentials. The transaction details may be transmitted by way of an antenna (e.g. antenna 10K) when the smartwatch comes in to close proximity to the contactless transaction module. The transaction details may be transmitted to the contactless transaction module by way of an NFC protocol. A user may have to select a payment application on the smartwatch in order for the transaction details to be available for transmission to the contactless transaction module.

In process block 633, an analog clock interface is adjusted in response to a rotation of a crown of the smartwatch. For example, the hands of an analog clock within the analog clock interface may move (rotate) in response to a rotation 263 of crown 233. In one embodiment, the analog clock interface is rendered to display 225 in response to sensing the crown 233 has been retracted (retracted position 261) from the housing of the smartwatch. In process block 635, an image of the analog clock interface is saved to a memory of the smartwatch in response to the crown being pushed back into the housing (i.e. unretracted position 265). Once the user selects their confirmation code (e.g. PIN) by adjusting the time of the analog clock, they may enter their selection by pushing the crown 233 back into the housing. The crown 233 may need to be retracted (retracted position 261) to enable rotating of the hands of the analog clock 421 for selecting the user's "what he knows" confirmation code. This may be alternatively referred to as authentication information known to the user. In process block 637, the time represented by the saved image is determined by image processing. In other words, the saved image of the analog clock indicates an analog time that can be converted to a digital time which will be used as the user's confirmation code. In one embodiment, the image processing includes comparing the saved image to an array of images. Each image in the array of image has a corresponding "time" associated with it. If a match is detected between the saved image and one of the images in the array, the corresponding "time" of the matched image from the array can be used. The "time" that was determined can then be transmitted as the confirmation code or PIN from the smartwatch to the contactless transaction module as the second component of a transaction authorization process, in process block 639. The time can be transmitted to the contactless transaction module using antenna 10K and an NFC protocol, for example.

Although two separate transmission steps are shown in process blocks 631 and 639, in other embodiments, data that is stored in the smartwatch and data known to the user (e.g., the PIN) may be selected and transmitted to the contactless transaction module in a single data transmission.

Figure 5B:
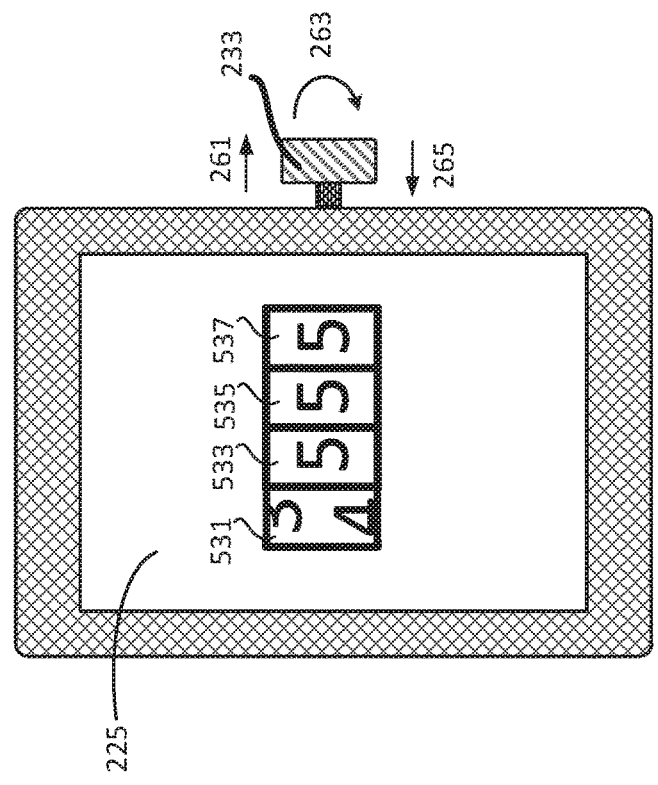
FIGS. 5A and 5B illustrates interfaces and a rotation of a crown of the smartwatch adjusting an input, according to an embodiment of the invention.
Figure 5A:
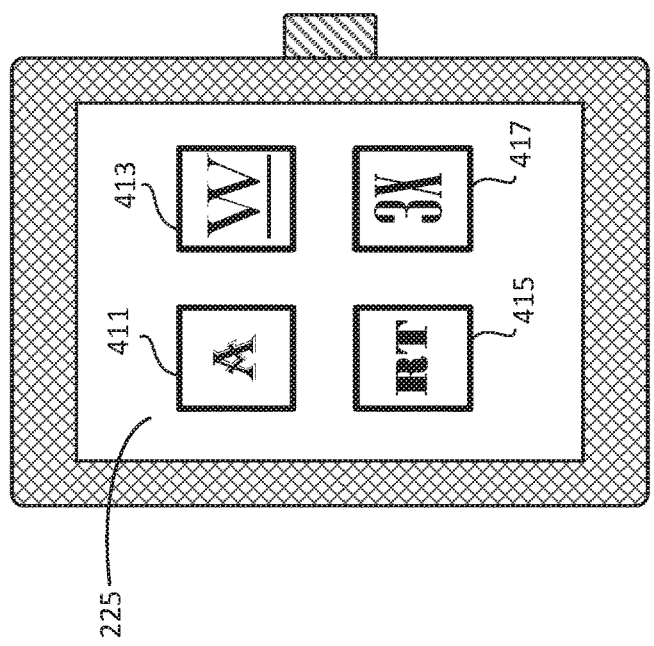

In FIG. 5A, application icons 411, 413, 415, and 417 are rendered on the display 225 of smartwatch 210. Similarly to FIG. 4A, application icons 411, 413, 415, and 417 represent mobile applications of smartwatch 210, in FIG. 5A. FIG. 5B illustrates an interface rendered to the display 225 of smartwatch 210 that includes four data fields 531, 533, 535, and 537. A confirmation code such as a PIN can be entered into data fields by adjusting a data element of the data field by way of crown 233. The elements of the data fields are illustrated as numerical in FIG. 5B, but the elements may be alpha-numeric or other symbols, in some embodiments.

Figure 7:
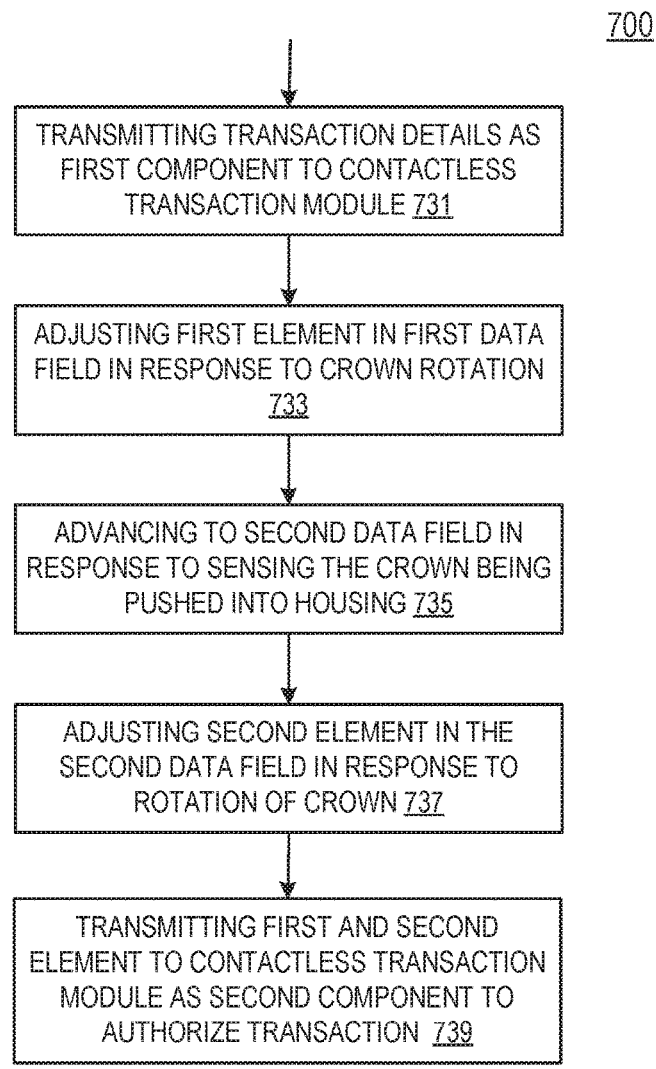

To illustrate further, FIG. 7 depicts an illustrative flow chart demonstrating an example process 700 for authorizing a transaction. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by processing logic 10C in conjunction with contactless element 10G and antenna 10K of a smartwatch. The code may be stored on a computer-readable storage medium (e.g. 10B), for example, in the form of a computer program including a plurality of instructions executable by one or more processors. The computer-readable storage medium may be non-transitory.

In process block 731, transaction details are transmitted by a smartwatch to a contactless transaction module (e.g. contactless transaction module 220) as a second "what he has" component of a transaction. The transaction details may include payment credentials. The transaction details may be transmitted by way of an antenna (e.g. antenna 10K) when the smartwatch comes in to close proximity to the contactless transaction module. The transaction details may be transmitted to the contactless transaction module by way of an NFC protocol. A user may have to select a payment application on the smartwatch in order for the transaction details to be available for transmission to the contactless transaction module.

In process block 733, a first element of a first data field is adjusted in response to a rotation of a crown of a smartwatch. In FIG. 5B, as crown 233 is rotated 263, the first element is transitioning from the number "3" to the number "4" in first data field 531. The crown 233 may need to be retracted to adjust the data element in the first data field 531. In process block 735, the interface advances to a second data field in response to sensing the crown of the smartwatch is being pushed into the housing. In FIG. 5B for example, the second element (illustrated as "5") of the second data field 533 can be adjusted after the crown 233 is pushed back into the housing (unretracted position 265). In process block 737, a second element in the second data field (e.g. 533) is adjusted in response to sensing the rotation 263 of crown 233. In one embodiment, the crown 233 is placed in the retracted position 261 to adjust the second data element in second data field 533. In other words, pushing the crown to the unretracted position 265 advances the interface to the next data field, but adjusting the data element in that next data field requires retracting the crown to the retracted position 261. Advancing to the third data field 535 and the fourth data field 537 can be executed by the user similarly to advancing from the first data field 531 to the second data field 533. In process block 739, at least the first and second elements (entered into the first and second data fields, respectively) are transmitted to a contactless transaction module (e.g. 220) as a second component to authorize a transaction. The first and second elements can be transmitted to the contactless transaction module using antenna 10K and an NFC protocol, for example. Of course, the first, second, third, and fourth element may be transmitted to the contactless transaction module when the confirmation code is a 4-digit PIN, for example.

Although two separate transmission steps are shown in process blocks 731 and 739, in other embodiments, data that is stored in the smartwatch and data known to the user (e.g., the PIN) may be selected and transmitted to the contactless transaction module in a single data transmission.

Embodiments of the invention have a number of technical advantages. For example, in embodiments of the invention, adjusting the time of the analog clock in the analog clock interface is an expedient way to enter a confirmation code or authentication number that is multiple digits. The disclosed analog clock interface allows the user to enter four numbers by rotating the crown of the smartwatch (and moving the crown to unretracted position 265 in some embodiments), where the rotation of the crown is potentially in one direction. This saves both the user and the merchant time in processing transactions or exchanging data. Additionally, changing an analog clock interface is a discreet way of entering a confirmation code (e.g. PIN) or authentication number that should be kept secret by the user of the smartwatch. Furthermore, in the context of a smartwatch, using a crown of the smartwatch as an input offers a mechanically efficient option to select and scroll through numbers or letters that are part of an a confirmation code (e.g. PIN) or authentication number. Using the crown of the smartwatch to enter a PIN may especially beneficial when compared with attempting to enter numbers or letters with fingertips on a relatively small touchscreen of the smartphone. Using the crown to efficiently enter data consistent with the disclosure also negates the need for a user to enter data via another hardware device, such as a smartphone.

Figure 8:
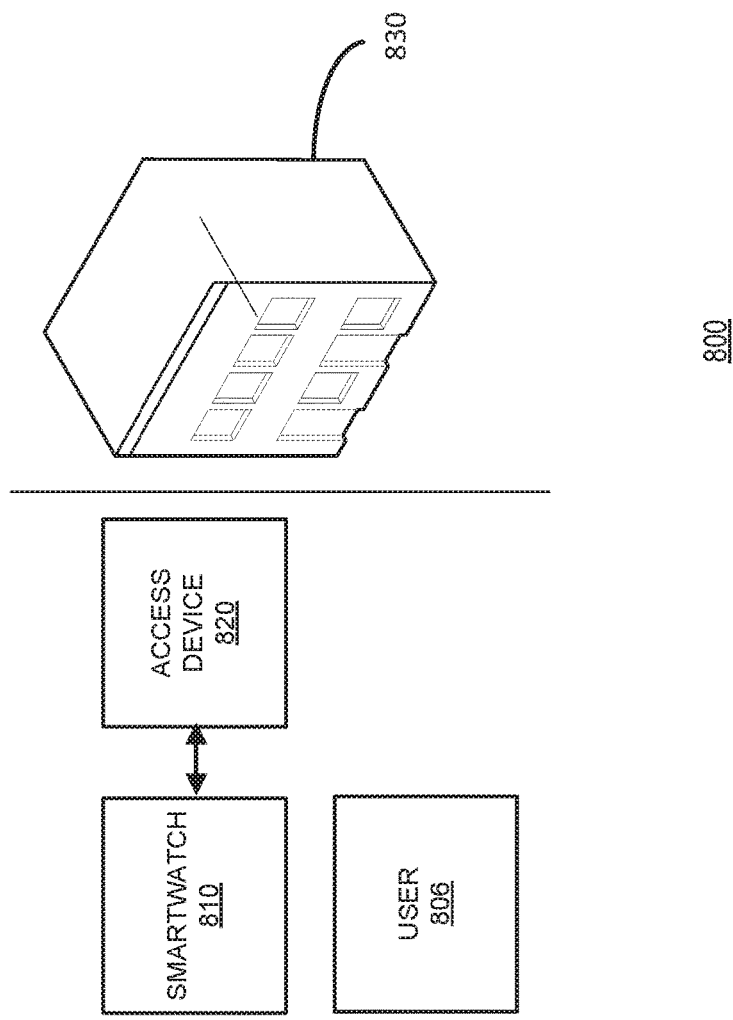
FIG. 8 show a block diagram of a building access system, according to embodiments of the invention.
Figure 9:
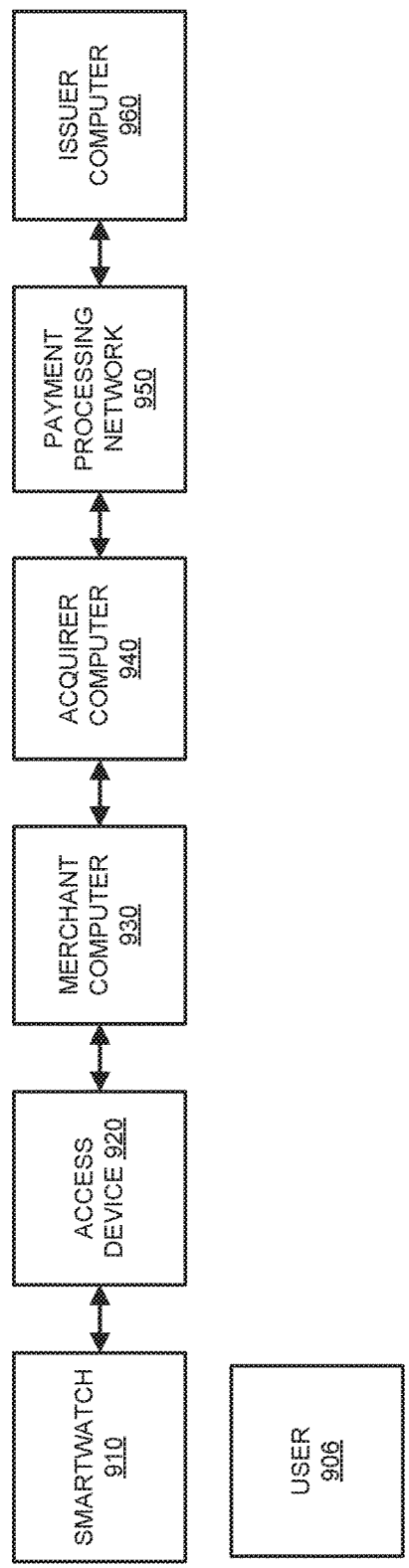
FIG. 9 show a block diagram of a transaction processing system that can interact with a smartwatch, according to embodiments of the invention.

FIGS. 8-9 respectively show transactions that can be conducted using the smartwatch and access device described above. FIG. 8 shows an interaction between a smartwatch and an access device, where a user of the smartwatch wants to enter a building or venue. FIG. 9 shows an interaction between a smartwatch and an access device, where the user of the smartwatch wants to conduct a payment transaction.

FIG. 8 shows a block diagram of a building access system 800, according to an embodiment of the invention. System 800 includes a smartwatch 810, an access device 820, and a building 830. Smartwatch 810 and access device 820 may include similar features as smartwatch 210 and access device 20, for example. A user 806 may gain access to building 830 when an access transaction is completed between smartwatch 810 and access device 820. The access transaction may include the exchange of transaction data for completing the access transaction. For example, the access device 820 may interrogate smartwatch 810 for access data to gain access to the building. The smartwatch 810 may provide the access data to access device 820 as a first component of a contactless data exchange. An interface of the smartwatch may also prompt a user/wearer of the smartwatch 810 to enter a "what he knows" component of the transaction to complete the access transaction. The user may enter his or her confirmation code using the crown of the smartwatch using either of the methods described in connection with FIGS. 4A-7. The access device 820 may locally verify the received access data and the confirmation code or it may communicate with a remotely located authentication server computer (not shown). The remotely located authentication server computer may verify that the access data and confirmation code is authentic and may transmit a signal indicating this back to the access device 820. The access device 820 may then proceed to let the user 806 enter the building 830, FIG. 9 shows a block diagram of a transaction processing system 900 that can interact with a smartwatch, according to embodiments of the invention. FIG. 9 shows a user 906 that can operate a smartwatch 910. The user 906 may use the smartwatch 910 to pay for a good or service at a merchant. The merchant may operate a merchant computer 930 and/or an access device 920. Smartwatch 910 and access device 920 may include similar features as smartwatch 210 and contactless transaction module 220, for example. The merchant may communicate with an issuer computer 960 via an acquirer computer 940 and a payment processing network 950.

The payment processing network 950 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a smartwatch 910 at an access device 920 (e.g. POS location) can be described as follows. A user 906 presents his or her smartwatch 910 to an access device 920 to pay for an item or service. The smartwatch 910 and the access device 920 interact such that access data from the smartwatch 910 (e.g. PAN, a payment token, verification value(s), expiration date, etc.) is received by the access device 920 (e.g. via contact or contactless interface) in addition to the confirmation code or authentication number as part of the "what he knows" portion of the transaction. The merchant computer 930 may then receive this information from the access device 920 via an external communication interface. The merchant computer 930 may then generate an authorization request message that includes the information received from the access device 920 (i.e. information corresponding to the smartwatch 910) along with additional transaction information (e.g. a transaction amount, merchant specific information, etc.) and electronically transmits this information to an acquirer computer 940. The acquirer computer 940 may then receive, process, and forward the authorization request message to a payment processing network 650 for authorization.

In general, prior to the occurrence of a credit or debit-card transaction, the payment processing network 950 has an established protocol with each issuer on how the issuer's transactions are to be authorized. In some cases, such as when the transaction amount is below a threshold value, the payment processing network 950 may be configured to authorize the transaction based on information that it has about the user's account without generating and transmitting an authorization request message to the issuer computer 960. In other cases, such as when the transaction amount is above a threshold value, the payment processing network 950 may receive the authorization request message, determine the issuer associated with the smartwatch 910, and forward the authorization request message for the transaction to the issuer computer 960 for verification and authorization. Once the transaction is authorized, the issuer computer 960 may generate an authorization response message (that may include an authorization code indicating the transaction is approved or declined) and transmit this electronic message via its external communication interface to payment processing network 950. The payment processing network 950 may then forward the authorization response message to the acquirer computer 940, which in turn may then transmit the electronic message comprising the authorization indication to the merchant computer 930, and then to the access device 920.

At the end of the day or at some other suitable time interval, a clearing and settlement process between the merchant computer 930, the acquirer computer 940, the payment processing network 950, and the issuer computer 960 may be performed on the transaction.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "n" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A smartwatch comprising:
   a housing;
   a display;
   an antenna;
   a crown of the smartwatch configured to be retracted from the housing and configured to be rotated;
   processing logic coupled to drive the display, wherein the processing logic is coupled to send and receive wireless signals of the antenna; and
   a computer readable medium accessible to the processing logic, the computer readable medium including instructions, executable by the processing logic for implementing a method comprising:
   performing a component of a transaction authorization process with an application of the smartwatch by:
      adjusting a time depicted on an interface rendered to the display in response to sensing a rotation of the crown of the smartwatch;
      upon completion of the rotation of the crown of the smartwatch, determining a specific time indicated via the interface rendered to the display; and
      transmitting, by the antenna, the specific time to a contactless transaction module in response to a selection of the specific time by a user of the smartwatch, wherein the specific time acts as a confirmation code to complete the transaction authorization process.

2. The smartwatch of claim 1, wherein the interface is an analog clock interface, and wherein the rotation of the crown moves hands of an analog clock in the analog clock interface, the input being a digital representation of an analog time that the analog clock is set to.

3. The smartwatch of claim 2, wherein the component of the transaction authorization process further includes:
   rendering the analog clock interface in response to sensing the crown has been retracted from the housing of the smartwatch;
   saving an image of the analog clock interface to a memory of the smartwatch in response to sensing the crown has been pushed back into the housing; and
   determining the specific time as being a time displayed on the analog clock interface when the crown is pushed back into the housing.

4. The smartwatch of claim 1, wherein the interface includes at least a first data field and a second data field, and wherein adjusting the input includes:
   adjusting a first element of the first data field in response to a first rotation of the crown;
   advancing to the second data field in response to sensing the crown has been pushed back into the housing; and
   adjusting a second element of the second data field in response to a second rotation of the crown, wherein the input includes the first element and the second element.

5. The smartwatch of claim 4, wherein the selection of the input includes sensing the crown has been pushed back into the housing after sensing the second rotation of the crown.

6. The smartwatch of claim 1, wherein the component is a second component of the transaction authorization process, and wherein the method further includes:
   performing a first component of the transaction authorization process with the application of the smartwatch, wherein performing the first component includes transmitting, by the antenna, transaction details to a contactless transaction module.

7. The smartwatch of claim 1, wherein the method further comprises:
   receiving a transaction completion notification from the contactless transaction module; and
   changing the interface in response to receiving the transaction completion notification.

8. The smartwatch of claim 1, wherein the method further comprises:
   rendering a plurality of applications on the display; and
   receiving, by a touch-screen interface of the smartwatch, a selection of the application.

9. The smartwatch of claim 8, wherein the rendering the plurality of applications is based at least in part on sensing a proximity of the contactless transaction module.

10. The smartwatch of claim 9, wherein sensing the proximity of the contactless transaction module includes receiving an interrogation signal from the contactless transaction module.

11. A method of authorizing a transaction, the method comprising:
   receiving, by an antenna of a smartwatch, a request for authentication of a transaction from a contactless transaction module;
   rendering an interface on a display of the smartwatch, the interface displaying time information;

adjusting the time information of the interface in response to sensing a rotation of a crown of the smartwatch, the rotation indicating an adjustment to the time information; and upon detecting that the rotation of the crown has ceased, determining an input as a specific time indicated via the interface on the display;

transmitting, by the antenna of the smartwatch, the input to the contactless transaction module, wherein the input acts as a confirmation code to complete the transaction.

12. The method of claim 11, wherein the interface is an analog clock interface, and wherein the rotation of the crown moves hands of an analog clock in the analog clock interface, the input being a digital representation of an analog time that the analog clock is set to.

13. The method of claim 12, wherein rendering the interface includes rendering the analog clock interface in response to sensing the crown has been retracted from a housing of the smartwatch, the method further comprising:

saving an image of the analog clock interface to a memory of the smartwatch in response to sensing the crown has been pushed back into the housing; and determining the specific time as being a time displayed on the analog clock interface when the crown is pushed back into the housing.

14. The method of claim 11, wherein the interface includes at least a first data field and a second data field, and wherein adjusting the input includes:

adjusting a first element of the first data field in response to a first rotation of the crown;

advancing to the second data field in response to sensing the crown has been pushed back into a housing of the smartwatch; and adjusting a second element of the second data field in response to a second rotation of the crown, wherein the input includes the first element and the second element.

15. The method of claim 14, wherein the confirmation of the input includes sensing the crown has been pushed back into the housing after sensing the second rotation of the crown.

16. The method of claim 11, wherein the antenna is configured to facilitate near-field communication (NFC).

17. The method of claim 11, further comprising:
receiving a transaction completion notification from the contactless transaction module; and
changing the interface in response to receiving the transaction completion notification.

18. The method of claim 11, further comprising:
rendering a plurality of applications on the display; and
receiving, by a touch-screen interface of the smartwatch, a selection of an application among the applications to complete the transaction.

19. The method of claim 18, wherein the rendering the plurality of applications is based at least in part on sensing a proximity of the contactless transaction module.

20. The method of claim 19, wherein sensing the proximity of the contactless transaction module includes receiving an interrogation signal from the contactless transaction module.

* * * * *